UNITED STATES PATENT OFFICE.

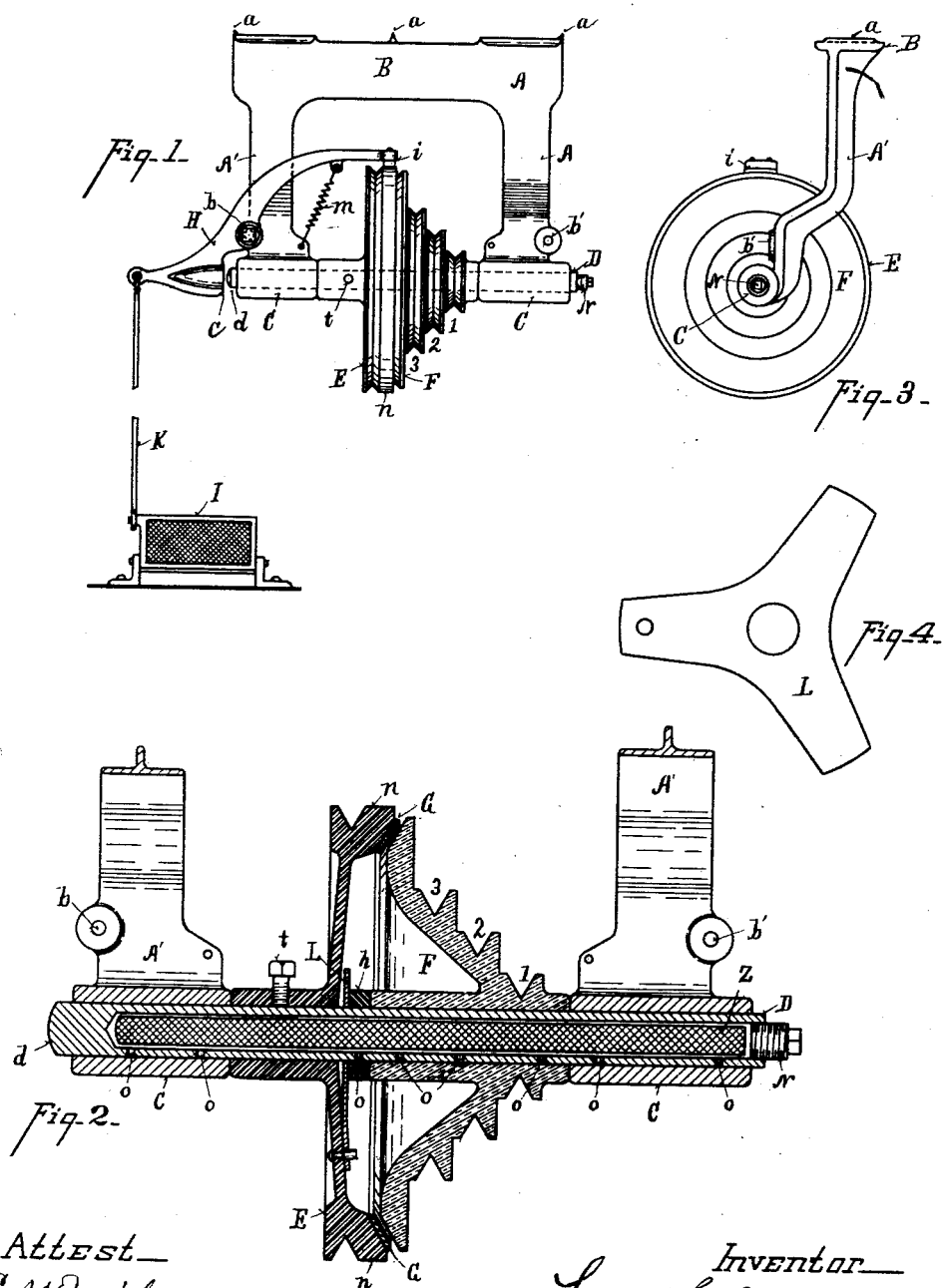

LOUIS L. MILLER, OF NEWPORT, KENTUCKY, ASSIGNOR TO THE ROSS, MOYER MANUFACTURING COMPANY, OF CINCINNATI, OHIO.

POWER-TRANSMITTER.

SPECIFICATION forming part of Letters Patent No. 520,326, dated May 22, 1894.

Application filed January 8, 1894. Serial No. 496,087. (No model.)

*To all whom it may concern:*

Be it known that I, LOUIS L. MILLER, a citizen of the United States, residing at Newport, in the county of Campbell and State of Kentucky, have invented certain new and useful Improvements in Power-Transmitters, of which the following is a specification.

The object of my invention is to provide a power transmitter which can be operated by the feet to stop and start the machine to be driven. It is especially adapted to operate sewing machines, and other light machinery of similar character which requires to be stopped and started often; with brake mechanism for instantly arresting the motion of the machine simultaneous with the stopping of the transmitter.

The various features of my invention are fully set forth in the description of the accompanying drawings, making a part of this specification, in which—

Figure 1 is a front elevation of my improvement in position for use. Fig. 2 is a central longitudinal section. Fig. 3 is an end elevation. Fig. 4 is a plan view of the spring.

In the preferred form of construction A represents the U-shaped frame, which is provided with a broad base B, with two or more small projections $a$ springing from the face of the base so as to enable the frame to be held securely by clamping pressure applied through the fastening screws. The arms A' are shown bent so as to enable the power transmitter to be attached at one side of the ordinary opening cut in the table, and have the transmitter vertically in line with the driving pulley on the sewing machine. Of course the transmitter may be attached to the floor and an ordinary pulley used for the treadle rope to pass over.

C, C, represent journal boxes in the ends of the arms A'. D represents a sleeve shaft journaled therein.

E represents a sheave secured to the sleeve shaft D by a set screw $t$; the sheave is shown adapted to be driven by a round belt from any power device.

F represents a cone sheave with mechanism adapted to clutch the same to the driving sheave E; it runs normally idle on the sleeve shaft and it has any desired number of transmitting steps 1, 2, 3, so as to regulate the speed by changing the position of the belt in the ordinary manner.

G represents a leather gasket superimposed upon the beveled face of the sheave E and secured thereto in any appropriate manner, so as to form a suitable friction face for the engagement of the inclined faces of the sheaves E and F. The two sheaves are brought into engagement by means of the lever H, treadle I, and connecting rod K. When treadle I is depressed the lever H is moved upon its pivot $b$ and brings the face $c$ in contact with the boss $d$ which is the solid end of the sleeve shaft; moving said shaft longitudinally in its bearings and bringing the sheave E in frictional contact with the sheave F, when both revolve with said shaft, causing sheave E to transmit power to the machine to be driven. In order to stop the driven sheave instantly I provide a spring L preferably formed of convex arms secured to the face of the sheave E and bearing against the hub of sheave F. In order to prevent wear on the spring, I have, however, interposed a loose collar $h$ between the spring and the hub of the sheave F; when the treadle I is released the spring L moves the sheave E quickly back to its normal position and releases the two sheaves from frictional contact.

$m$ represents a retractile spring attached to the arm A', and to the lever H; this spring performs two functions; it quickly moves the face $c$ from the boss $d$; and the free end of lever H is provided with a brake-shoe $i$ engaging with the face $n$ of the sheave E; the spring $m$ has sufficient retractile force to hold the brake-shoe $i$ in contact with the sheave E and so instantly arrest the revolution of said shaft. It is a desideratum to lubricate the journals of such transmitters by the lubricant applied through the sleeve shaft. To accomplish this I have provided a series of holes $o$ in said shaft opposite the several journal bearings, preferably two or more, to each journal bearing, and insert inside of said shaft a lubricant candle Z made of tallow, or any other well known lubricant substance. The end of said shaft is closed by the screw plug N; the lubricant will under a very slight heat pass through the orifices $o$ and lubricate the journal bearings, thereby saving the frequent application of oil and avoiding the dripping or throwing of grease. By having the sleeve shaft closed at both ends the lubricant can escape only as drawn out by the friction and heat, and one charge of lubricant applied in this manner will last for a very long time.

I have shown the sleeve shaft D as solid at one end but it may be hollow all the way through and a second screw plug N applied.

Sometimes it is desired to reverse the position of the sheaves; that is, turn them end for end on the sleeve shaft; the brake-lever H is likewise reversible, both faces being made alike so that it can be attached to the center $b'$ upon the opposite arm $A'$ of the U-shaped frame, and this is one of the purposes of the U-shaped frame.

Having described my invention, what I claim is—

1. In a power-transmitter, the combination with a supporting frame, of a lengthwise movable sleeve-shaft D constructed to receive the lubricating candle Z which is insertible lengthwise thereinto through an opening in one end thereof, said shaft having orifices $o$ through which the lubricant descends by gravity, the sheaves E and F, one journaled loosely on the sleeve-shaft, and the other rigidly secured thereto, a lever H for moving the sleeve-shaft lengthwise in bearings on the supporting frame to throw one sheave into contact with the other, and a plug N closing the end of the sleeve-shaft through which the candle is inserted, substantially as described.

2. A power-transmitter comprising the U-shaped frame, the sleeve-shaft D, the sheaves E, F, one journaled loosely on the sleeve-shaft, and the other fastened thereon, the spring L interposed between the hubs of said sheaves, the lever H and the journal centers $b, b'$ upon said frame, the parts being so constructed that said lever and sheaves may be reversed in position on said frame, substantially as described and for the purpose specified.

In testimony whereof I have hereunto set my hand.

LOUIS L. MILLER.

Witnesses:
T. SIMMONS,
WILL R. WOOD.